United States Patent
De Rovere et al.

(10) Patent No.: US 8,916,102 B2
(45) Date of Patent: Dec. 23, 2014

(54) MOUNTING MAT AND POLLUTION CONTROL DEVICE WITH THE SAME

(75) Inventors: Anne N. De Rovere, Woodbury, MN (US); Lahoussaine Lalouch, Oise (FR); Richard P. Merry, St. Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 730 days.

(21) Appl. No.: 13/127,193

(22) PCT Filed: Oct. 27, 2009

(86) PCT No.: PCT/US2009/062188
§ 371 (c)(1),
(2), (4) Date: Jun. 10, 2011

(87) PCT Pub. No.: WO2010/062588
PCT Pub. Date: Jun. 3, 2010

(65) Prior Publication Data
US 2011/0232243 A1    Sep. 29, 2011

Related U.S. Application Data

(60) Provisional application No. 61/110,694, filed on Nov. 3, 2008.

(51) Int. Cl.
*B01D 53/92* (2006.01)
*F01N 3/08* (2006.01)
(Continued)

(52) U.S. Cl.
CPC . *D04H 1/42* (2013.01); *D04H 1/46* (2013.01); *F01N 3/2853* (2013.01); *F01N 13/141* (2013.01); *B01D 2255/206* (2013.01); *B01D 2255/2092* (2013.01); *B01D 2255/30* (2013.01); *B01D 2255/9207* (2013.01); *B01D 2258/012* (2013.01); *B01D 2258/014* (2013.01); *Y10S 55/03* (2013.01); *Y10S 428/92* (2013.01); *Y10S 428/921* (2013.01)
USPC .......... 422/177; 55/523; 55/DIG. 3; 422/179; 422/180; 422/221; 422/222; 422/168; 501/95.01; 501/95.02; 501/95.1; 501/36; 428/920; 428/921

(58) Field of Classification Search
CPC .......... F01N 3/08; F01N 13/14; F01N 13/16; B01D 53/92
USPC ............. 55/523, DIG. 30; 422/177, 179, 180, 422/221, 222, 168; 501/95.01, 95.02, 95.1, 501/36; 428/920, 921
See application file for complete search history.

(56) References Cited

U.S. PATENT DOCUMENTS 2,624,658 A    1/1953    Parker
2,718,461 A    9/1955    Parker
(Continued)

FOREIGN PATENT DOCUMENTS

EP    0643204    3/1995
EP    1486648    12/2004
(Continued)

OTHER PUBLICATIONS

PCT International Search Report for PCT/US2009/062188, mailed Apr. 6, 2010.

*Primary Examiner* — Christopher P Jones
*Assistant Examiner* — Minh-Chau Pham

(57) ABSTRACT

Non-woven mat including magnesium aluminum silicate glass fibers and amorphous refractory ceramic fibers, biosoluble ceramic fibers, and/or heat-treated silica fibers. Embodiments of the nonwoven mat surprisingly have a Resiliency Value after three thermal cycles from 25° C. to 700° C./400° C. of the Real Condition Fixture Test at least 1.1 times greater than the Resiliency Value of a comparable non-woven mat consisting of any individual type of fibers of the non-woven mat. The non-woven mats are useful, for example, in pollution control devices and other thermal insulation applications.

20 Claims, 1 Drawing Sheet

(51) Int. Cl.
*F01N 13/14* (2010.01)
*F01N 13/16* (2010.01)
*D04H 1/42* (2012.01)
*D04H 1/46* (2012.01)
*F01N 3/28* (2006.01)

(56) References Cited

U.S. PATENT DOCUMENTS

| | | | |
|---|---|---|---|
| 3,498,774 | A | 3/1970 | Saffadi |
| 4,038,214 | A | 7/1977 | Gotoh |
| 4,181,514 | A | 1/1980 | Lefkowitz |
| 4,199,336 | A | 4/1980 | Rittler |
| 5,250,269 | A | 10/1993 | Langer |
| 5,290,522 | A | 3/1994 | Rogers |
| 5,332,699 | A | 7/1994 | Olds |
| 5,464,952 | A | 11/1995 | Shah |
| 5,585,312 | A | 12/1996 | TenEyck |
| 5,714,421 | A | 2/1998 | Olds |
| 5,874,375 | A * | 2/1999 | Zoitos et al. ............ 501/36 |
| 6,468,932 | B1 | 10/2002 | Robin |
| 8,124,022 | B2 * | 2/2012 | Howorth et al. ............ 422/179 |
| 8,186,058 | B2 * | 5/2012 | Merry ............ 29/890 |
| 8,404,187 | B1 * | 3/2013 | Fernando et al. ............ 422/179 |
| 8,460,611 | B2 * | 6/2013 | Yasuda ............ 422/179 |
| 8,480,916 | B2 * | 7/2013 | Fernando et al. ............ 252/62 |
| 8,627,853 | B1 * | 1/2014 | Fernando et al. ............ 138/149 |
| 2006/0257298 | A1 | 11/2006 | Merry |

FOREIGN PATENT DOCUMENTS

| | | |
|---|---|---|
| EP | 1696110 | 8/2006 |
| EP | 1736644 | 12/2006 |
| EP | 2008045239 | 2/2008 |
| JP | 2002047070 | 2/2002 |
| JP | 2003097262 | 4/2003 |
| WO | WO 03/031368 | 4/2003 |
| WO | WO 2004/011785 | 2/2004 |
| WO | WO 2004/031544 | 4/2004 |
| WO | WO 2006/055188 | 5/2006 |
| WO | WO 2006/065534 | 6/2006 |
| WO | WO 2007/044485 | 4/2007 |
| WO | WO 2007/146568 | 12/2007 |

* cited by examiner

MOUNTING MAT AND POLLUTION CONTROL DEVICE WITH THE SAME

CROSS REFERENCE TO RELATED APPLICATIONS

This application is a national stage filing under 35 U.S.C. 371 of PCT/US2009/062188, filed Oct. 27, 2009, which claims priority to U.S. Application No. 61/110,694, filed Nov. 3, 2008, the disclosures of which are incorporated by reference in their entireties herein.

BACKGROUND

Pollution control devices such as catalytic converters for gasoline engines have been known for over 30 years. In the last few years, more stringent regulations for diesel vehicles have resulted in a rapid increase of other pollution control devices including diesel oxidation catalysts (DOC's), diesel particulate filters (DPF's), and selective catalytic reduction devices (SCR's). The pollution control devices typically comprise a metal housing or casing with a pollution control element securely mounted within the casing by a resilient and flexible mounting mat. Catalytic converters, including diesel oxidation converters, contain a catalyst, which is typically coated on a monolithic structure. The monolithic structures are typically ceramic, although metal monoliths are also known. The catalyst in a gasoline engine oxidizes carbon monoxide and hydrocarbons and reduces the oxides of nitrogen to control atmospheric pollution. A diesel oxidation catalyst oxidizes the soluble organic fraction of soot particles as well as any carbon monoxide present.

Diesel particulate filters or traps are typically wall-flow filters, which have honeycombed, monolithic structures that are typically made from porous crystalline ceramic materials. Alternate cells of the honeycombed structure are typically plugged such that exhaust gas enters in one cell and is forced through the porous wall to an adjacent cell where it can exit the structure. In this way, the small soot particles that are present in diesel exhaust are collected. From time to time, the temperature of the exhaust gas is increased above the incineration temperature of the soot particles so that they are burned. This process is called "regeneration."

Selective catalytic reducers are similar in structure and in function (i.e., reduce NOx) to catalytic converters. A gaseous or liquid reductant (generally ammonia or urea) is added to the exhaust gas before reaching the selective catalytic reducer monolith. The mixed gases cause a reaction between the NOx emissions and the ammonia or urea. The reaction converters the NOx emissions into pure nitrogen and oxygen.

The monoliths, and in particular the ceramic pollution control monoliths, used in pollution control devices are fragile, and susceptible to vibration or shock damage and breakage. They have a coefficient of thermal expansion generally an order of magnitude less than the metal housing that contains them. This means that as the pollution control device is heated the gap between the inside periphery wall of the housing and the outer wall of the monolith increases. Even though the metallic housing undergoes a smaller temperature change due to the insulating effect of the mat, the higher coefficient of thermal expansion of the metallic housing causes the housing to expand to a larger peripheral size faster than the expansion of the ceramic monolith. Such thermal cycling occurs hundreds of times during the life and use of the pollution control device.

To avoid damage to the ceramic monoliths from road shock and vibration, to compensate for the thermal expansion difference, and to prevent exhaust gases from passing between the monolith and metal housing (thereby bypassing the catalyst), mounting mats are disposed between the ceramic monolith and metal housing. These mats exert sufficient pressure to hold the monolith in place over the desired temperature range but not so much pressure as to damage the ceramic monolith.

Known mats include intumescent sheet materials comprised of ceramic fibers, intumescent materials and organic and/or inorganic binders. In recent years, non-intumescent mats, especially those comprised of polycrystalline ceramic fibers and binder, have been used. Polycrystalline fibers are much more expensive than (melt-formed) amorphous refractory ceramic fibers (i.e., a fiber that is melt formed and has not been post processed by heat treating to either anneal or crystallize the fiber, so as to be substantially crystalline free, meaning that no crystallinity is detected by powder x-ray diffraction) and, therefore, mats using these fibers are used where deemed absolutely necessary such as with ultra thin-wall monoliths or for pollution control devices that are exposed to water during use (due to filter cleaning, water condensation, rain water from vertical stacks, etc.). Water can have a deleterious effect on certain intumescent mounting materials. Non-intumescent mats comprising only amorphous refractory ceramic fibers generally lack the necessary holding force to function as a mounting mat. Performance of amorphous refractory ceramic fibers can be improved, but it typically requires expensive shot removal and heat treatment to high temperature to at least partially crystallize the fibers. Mats comprising magnesium aluminum silicate glass fibers have also been tried, but generally lack sufficient temperature capability.

SUMMARY

In one aspect, the present disclosure describes a non-woven mat comprised of a blend comprised of at least 60 (in some embodiments, at least 65, 70, 75, 80, 85, or even 90) percent by weight fibers selected from the group consisting of magnesium aluminum silicate glass fibers and at least 10 (in some embodiments, at least 15, 20, 25, 30, 35, or even 40) percent by weight of fibers selected from the group consisting of amorphous refractory ceramic fibers, bio-soluble ceramic fibers, heat-treated silica fibers, and mixtures thereof, based on the total weight of the mat, wherein the magnesium aluminum silicate glass fibers comprise $Al_2O_3$ in a range from 10 to 30 percent by weight, $SiO_2$ in a range from 52 to 70 percent by weight, and MgO in a range from 1 to 12 percent by weight, based on the total weight of the magnesium aluminum silicate glass fiber, and wherein the non-woven mat is collectively comprised of at least 80 (in some embodiments at least 85, 90, 95, 96, 97, 98, 99, or even 100) by weight of the magnesium aluminum silicate glass fibers and the fibers selected from the group consisting of amorphous refractory ceramic fibers, bio-soluble ceramic fibers, heat-treated silica fibers, and mixtures thereof, based on the total weight of the mat. In some embodiments, the blend collectively comprises at least 80 (in some embodiments, at least 85, 90, 95, 96, 97, 98, 99, or even 100) percent by weight of the magnesium aluminum silicate glass fibers and the fibers selected from the group consisting of amorphous refractory ceramic fibers, bio-soluble ceramic fibers, heat-treated silica fibers, and mixtures thereof. In some embodiments, the blend collectively comprising at least 80 (in some embodiments, at least 85, 90, 95, 96, 97, 98, 99, or even 100) percent by weight of the magnesium aluminum silicate glass fibers and the amorphous refractory ceramic fibers. In some embodiments, the blend collectively comprises at least 80 (in some embodiments, at least 85, 90, 95, 96, 97, 98, 99, or even 100) percent by weight of the magnesium aluminum silicate glass fibers and the bio-soluble ceramic fibers. In some embodiments, the blend collectively comprises at least 80 (in some embodiments, at least 85, 90, 95, 96, 97, 98, 99, or even 100) percent by weight of the magnesium aluminum silicate glass fibers and the heat-treated silica fibers.

A non-woven mat comprised of a blend comprised of at least 60 (in some embodiments, at least 65, 70, 75, 80, 85, or even 90) percent by weight magnesium aluminum silicate glass fibers and at least 10 (in some embodiments, at least 15, 20, 25, 30, 35, or even 40) percent by weight bio-soluble ceramic fibers, wherein the magnesium aluminum silicate glass fibers comprise $Al_2O_3$ in a range from 10 to 30 percent by weight, $SiO_2$ in a range from 52 to 70 percent by weight, and MgO in a range from 1 to 12 percent by weight, based on the total weight of the magnesium aluminum silicate glass fiber, and wherein the non-woven mat is collectively comprised of at least 80 (in some embodiments at least 85, 90, 95, 96, 97, 98, 99, or even 100) percent by weight of the magnesium aluminum silicate glass fibers and the bio-soluble ceramic fibers, based on the total weight of the mat. In some embodiments, the blend collectively comprises at least 80 (in some embodiments, at least 85, 90, 95, 96, 97, 98, 99, or even 100) percent by weight of the magnesium aluminum silicate glass fibers and the bio-soluble ceramic fibers.

A non-woven mat comprised of a blend comprised of at least 60 (in some embodiments, at least 65, 70, 75, 80, 85, or even 90) percent by weight magnesium aluminum silicate glass fibers and at least 10 (in some embodiments, at least 15, 20, 25, 30, 35, or even 40) percent by weight heat-treated silica fibers, wherein the magnesium aluminum silicate glass fibers comprise $Al_2O_3$ in a range from 10 to 30 percent by weight, $SiO_2$ in a range from 52 to 70 percent by weight, and MgO in a range from 1 to 12 percent by weight, based on the total weight of the magnesium aluminum silicate glass fiber, and wherein the non-woven mat is collectively comprised of at least 80 (in some embodiments at least 85, 90, 95, 96, 97, 98, 99, or even 100) percent by weight of the magnesium aluminum silicate glass fibers and the heat-treated silica fibers, based on the total weight of the mat. In some embodiments, the blend collectively comprises at least 80 (in some embodiments, at least 85, 90, 95, 96, 97, 98, 99, or even 100) percent by weight of the magnesium aluminum silicate glass fibers and the heat-treated silica fibers.

In some embodiments, wherein the mat as-made prior to heating above 500° C. contains not greater than 5 (in some embodiments, not greater than 4, 3, 2, 1, 0.75, 0.5, 0.25, 0.1, or even zero) percent by weight organic material (e.g., binder), based on the total weight of the mat.

Surprisingly, for some embodiments of non-woven mats described herein the magnesium aluminum silicate glass fibers and the amorphous refractory ceramic fibers, bio-soluble ceramic fibers, and/or heat-treated silica fibers (as applicable) present in the blend collectively provide the non-woven mat with a Resiliency Value after three thermal cycles from 25° C. to 700° C./400° C. of the Real Condition Fixture Test (as determined according to Example 1) at least 1.1 (in some embodiments, at least 1.2, 1.25, 1.3, 1.4, 1.5, 1.6, 1.7, 1.75, or even at least 1.8) times greater than the Resiliency Value of a comparable non-woven mat consisting of any individual magnesium aluminum silicate glass fibers, amorphous refractory ceramic fibers, bio-soluble ceramic fibers, and heat-treated silica fibers, present in the blend of fibers.

Typically, the magnesium aluminum silicate glass fibers used to make non-woven mats described herein are shot free or contain a very low amount of shot (in some embodiments, less than 1% by weight, based on total weight of the fibers).

Non-woven mats described herein are useful, for example, in pollution control devices and thermal insulation applications. An exemplary pollution control device comprises a pollution control element (e.g., catalytic converter, a diesel particulate filter, or a selective catalytic reduction element) mounted in a casing with a non-woven mat described herein.

DETAILED DESCRIPTION

Figure 1:
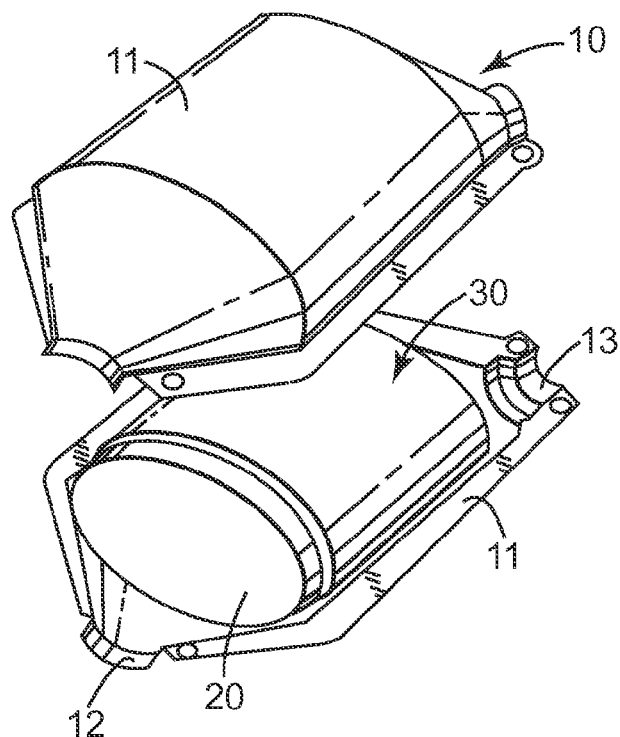
FIG. 1 is a perspective view of an exemplary pollution control device described here.

Referring to the FIG. 1, pollution control device 10 comprises metallic casing 11 with generally frusto-conical inlet and outlet ends 12 and 13, respectively. Disposed within casing 11 is pollution control element 20 surrounded by mounting mat according to the present disclosure 30. Mounting mat serves to tightly but resiliently support and hold monolithic element 20 within casing 11 and seals the gap between the pollution control element casing 11, preventing or reducing (preferably minimizing) exhaust gases from by-passing pollution control element 20.

Figure 2:
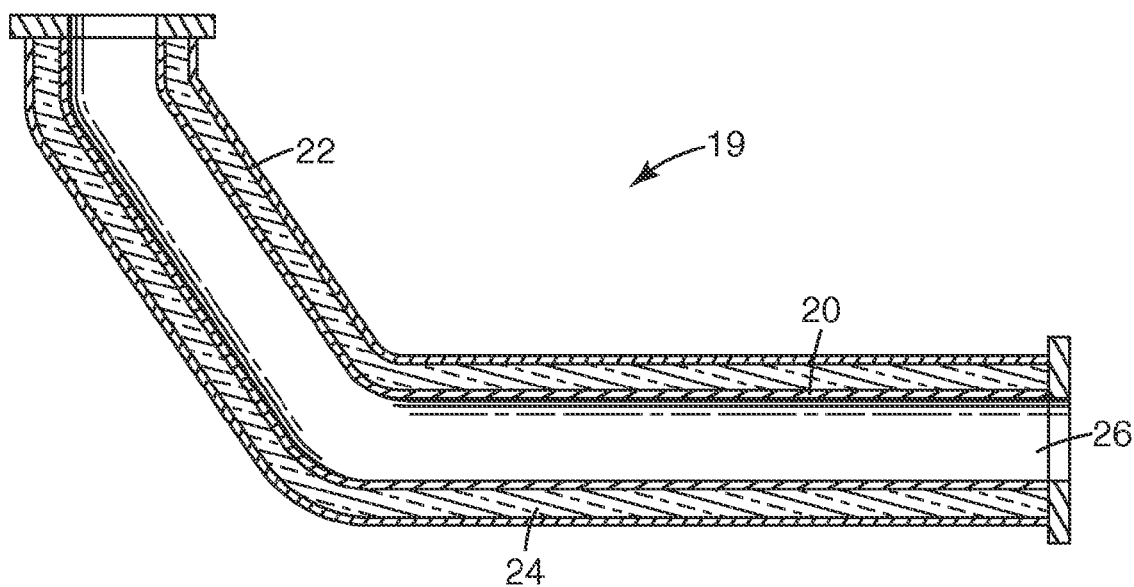
FIG. 2 is a longitudinal cross section of an exemplary exhaust pipe described here.

Referring now to FIG. 2, exhaust pipe 19 comprises a double wall having first outer metal wall 22, second and inner metal wall 20. Mat according to the present disclosure 24 is disposed in the gap between outer wall 22 and inner wall 20 and provides thermal insulation. The double wall of exhaust pipe 19 surrounds interior space 26 through which exhaust gas flows through when exhaust pipe 19 is in use in an exhaust system of a motor vehicle.

Exemplary magnesium aluminum silicate glass fibers for making mounting mats described herein include E-glass fibers, S-glass fibers, S-2 glass fibers, R-glass fibers, and mixture thereof. Magnesium aluminum silicate glass fibers used in the non-woven mounting mat typically have an average diameter of at least 5 micrometers (in some embodiments, at least 7 micrometers; in some embodiments in a range from 7 micrometers to 14 micrometers) and a length in a range from 0.5 cm to 15 cm (in some embodiments, in a range from 1 cm to 12 cm). Magnesium aluminum silicate glass fibers are typically continuous. Typically, the continuous fibers are generally individualized. To provide individualized fibers, a tow or yarn of fibers can be chopped, for example, using a glass roving cutter (commercially available, for example, under the trade designation "MODEL 90 GLASS ROVING CUTTER" from Finn & Fram, Inc., Pacoma, Calif.), to the desired length (typically in the range from about 0.5 to 15 cm). Typically, the magnesium aluminum silicate glass fibers are shot free, or contain a very low amount of shot (typically less than 1% by weight, based on total weight of magnesium aluminum silicate glass fibers). Additionally, the magnesium aluminum silicate glass fibers are typically reasonably uniform in diameter (i.e., the amount of magnesium aluminum silicate glass fibers having a diameter of plus/minus 3 micrometers on the average is at least 70% by weight (in some embodiments, at least 80%, or even at least 90% by weight) of the total weight of the magnesium aluminum silicate glass fibers).

The magnesium aluminum silicate glass fibers comprise, by weight (on a theoretical oxide basis), in a range from 10 to 30 percent $Al_2O_3$, in a range from 52 to 70 percent $SiO_2$, and in a range from 1 to 12 percent MgO. Optionally, the magnesium aluminosilicate glass fibers further comprise additional oxides (e.g., $Na_2O$, $K_2O$, $B_2O_3$, and/or CaO). Particular examples of magnesium aluminum silicate glass fibers include E-glass fibers, which typically comprise, by weight, about 55% $SiO_2$, 11% $Al_2O_3$, 18% CaO, 6% $B_2O_3$, 5% MgO, and 5% other oxides; S and S-2 glass fibers which, typically comprise about 65% $SiO_2$, 25% $Al_2O_3$, and 10% MgO; and R-glass fibers, which typically comprise about 60% $SiO_2$, 25% $Al_2O_3$, 9% CaO, and 6% MgO. E-glass, S-glass and S-2 glass are commercially available, for example, from Advanced Glassfiber Yarns, LLC, Aiken, S.C. R-glass is commercially available, for example, from Saint Gobain Vetrotex, Chambery, France.

Exemplary aluminosilicate amorphous refractory ceramic fibers include blown or spun amorphous refractory ceramic fibers (commercially available, for example, from Thermal Ceramics, Augusta, Ga., under the trade designation "KAOWOOL" and "CERAFIBER," and from Unifrax Corporation, Niagara Falls, N.Y., under the trade designation "FIBERFRAX").

Exemplary biosoluble inorganic fibers include those comprised of oxides of silicon, magnesium, and calcium. These types of fibers are typically referred to as calcium magnesium silicate fibers. The calcium magnesium silicate fibers usually contain less than about 10 weight percent $Al_2O_3$. In some embodiments, the fibers include about 45 to about 90 weight percent $SiO_2$, up to about 45 weight percent CaO, up to about 35 weight percent MgO, and less than about 10 weight percent $Al_2O_3$. For example, the fibers can contain about 55 to about 75 weight percent $SiO_2$, about 25 to about 45 weight percent CaO, about 1 to about 10 weight percent MgO, and less than about 5 weight percent $Al_2O_3$.

In another exemplary embodiment, the biosoluble inorganic fibers include oxides of silica and magnesium. These types of fibers are typically referred to as magnesium silicate fibers. The magnesium silicate fibers usually contain from about 60 to about 90 weight percent $SiO_2$, up to about 35 weight percent MgO (typically, from about 15 to about 30 weight percent MgO), and less than about 5 weight percent $Al_2O_3$. For example, the fibers can contain about 70 to about 80 weight percent $SiO_2$, about 18 to about 27 weight percent MgO, and less than about 4 weight percent of other trace elements.

Biosoluble inorganic fibers can be made by a variety of methods, including sol gel formation, crystal growing processes, and melt forming techniques (e.g., spinning or blowing). Suitable biosoluble inorganic oxides fibers are described, for example, in U.S. Pat. No. 5,332,699 (Olds et al.), U.S. Pat. No. 5,585,312 (Ten Eyck et al.), U.S. Pat. No. 5,714,421 (Olds et al.), and U.S. Pat. No. 5,874,375 (Zoitas et al.); and in European Patent Application No. 02078103.5, filed Jul. 31, 2002.

Biosoluble fibers are commercially available, for example, from Unifrax Corporation, Niagara Falls, N.Y., under the trade designations "ISOFRAX" and "INSULFRAX," under the trade designations "SUPERMAG 1200" from Nutec Fiberatec, Monterrey, Mexico, and Thermal Ceramics, Augusta, Ga., under the trade designation "SUPERWOOL." "SUPERWOOL 607" biosoluble fibers, for example, contain 60 to 70 weight percent $SiO_2$, 25 to 35 weight percent CaO, 4 to 7 weight percent MgO, and a trace amount of $Al_2O_3$. "SUPERWOOL 607 MAX" biosoluble fibers, for example, which can be used at a slightly higher temperature, contain 60 to 70 weight percent $SiO_2$, 16 to 22 weight percent CaO, 12 to 19 weight percent MgO, and a trace amount of $Al_2O_3$.

Suitable biosoluble inorganic fibers for use in making the non-woven mats described herein can have a wide range of average diameters and average lengths. For example, biosoluble inorganic fibers are commercially available that have an average fiber diameter in the range of about 0.05 micrometer to about 15 micrometers. In some embodiments, the biosoluble inorganic fibers have average fiber diameters in the range of about 0.1 micrometer to about 5 micrometers.

The biosoluble inorganic fibers typically have an average fiber length in the range of about 0.1 cm to about 3 cm.

As used herein, the term "heat-treated silica fibers" refers to fibers comprising at least 80 (in some embodiments at least 85, 90, 92, 93, 94, 95, 96, 97, 98, 99, 99.5, 99.9, or even 100) percent by weight $SiO_2$, which have been exposed to a heat treatment temperature of at least 400° C. for a heat treatment period of at least 5 minutes. Other oxides which may be present in the silica fibers include those known in the art for such fibers, including $Al_2O_3$, MgO, $B_2O_3$, CaO, and $TiO_2$). In some exemplary embodiments, the heat-treated silica fibers comprise about 92 to about 95 percent by weight silica and 8 to about 5 percent by weight alumina, based on a total weight of the fibers In some embodiments, the heat-treated silica fibers may be heat-treated by exposing the fibers to a heat treatment temperature of at least 400° C., 500° C., 600° C., 700° C., 800° C., 900° C., 1000° C., or even higher) for a heat treatment period of at least about 5 minutes, 10 minutes, 15 minutes, 20 minutes, 25 minutes, 30 minutes, 35 minutes, 40 minutes, 45 minutes, 50 minutes, 55 minutes, 60 minutes, or longer. In some exemplary embodiments, heat-treated silica fibers were heat-treated by (i) heating the fibers from room temperature to a maximum heat treatment temperature from about 600° C. to about 1100° C., (ii) maintaining the maximum heat treatment temperature for a heat treatment period of about 5 to about 60 minutes (more typically about 60 minutes), and (iii) allowing the fibers to cool to room temperature. In some exemplary embodiments, heat-treated silica fibers used in the present invention are heat-treated by (i) heating the fibers from room temperature to a maximum heat treatment temperature of at least about 850° C. (in some embodiments, from about 850° C. to about 1050° C.), (ii) maintaining the maximum heat treatment temperature for a heat treatment period of at least about 60 minutes (typically about 60 minutes), and (iii) allowing the fibers to cool to room temperature.

Various methods can be used to form heat-treated silica fibers (see, e.g., U.S. Pat. No. 2,624,658 (Parker et al.), U.S. Pat. No. 2,718,461 (Parker et al.), U.S. Pat. No. 6,468,932 (Richter et al.), U.S. Pat. No. 3,498,774 (Saffadi et al.), and U.S. Pat. No. 4,038,214 (Sotoji et al.), the disclosure of which is incorporated herein by reference.

Exemplary heat-treated high silica content fibers are commercially available from Hitco Carbon Composites, Inc., Gardena, Calif., under the trade designation "REFRASIL," and belChem Fiber Materials GmbH, Freiberg, Germany, under the trade designation "BELCOTEX". For example, the "REFRASIL F100" fiber contains about 96 to about 99 percent by weight $SiO_2$, while the "BELCOTEX" fiber contains about 94.5 percent by weight $SiO_2$.

Suitable heat-treated silica fibers can have a wide range of average diameters and average lengths. Heat-treated silica fibers are commercially available that have an average fiber diameter in the range of about 0.05 micrometer to about 15 micrometers (in some embodiments about 5 micrometers to about 10 micrometers).

The heat-treated silica fibers typically have an average fiber length in the range of about 0.1 cm to about 3 cm. Generally, the length of the heat-treated silica fibers is not critical as any selected fiber(s) can be broken down into smaller lengths during the manufacturing process, if desired.

Typically, the heat-treated silica fibers are continuous, and generally individualized as discussed above for the magnesium aluminum silicate fibers.

Optionally, some embodiments of non-woven mats described herein further comprise other fibers, including basalt fibers. Basalt fibers are made from the mineral basalt. Basalt is a hard, dense volcanic rock that can be found in most countries. The basalt is crushed, washed, melted, and fed into platinum-rhodium extrusion bushings to form continuous filaments. Because the fibers are derived from a mineral, the composition of the fibers can vary but generally has a composition, by weight, of about 45 to about 55 percent $SiO_2$, about 2 to about 6 percent alkalis, about 0.5 to about 2 percent $TiO_2$, about 5 to about 14 percent FeO, about 5 to about 12 percent MgO, at least about 14 percent by weight $Al_2O_3$, and often nearly about 10 percent CaO. Typically, the basalt fibers have diameters in a range from 5 to 22 micrometers (preferably, 9 to 13 micrometers). The fibers are typically shot free, or contain a very low amount of shot (typically less than 1% by weight). The continuous fibers can be cut to predetermined lengths. Typically a length of about 0.5 to about 15 cm is suitable for mounting mat described herein. Suitable chopped basalt fibers are commercially available, for example, from Sudaglass Fiber Technology, Houston, Tex., and Kamenny Vek, Dubna, Russia. Typically, the basalt fibers are generally individualized as discussed above for the magnesium aluminum silicate fibers.

Optionally, mounting mats described herein may further comprise intumescent material (e.g., vermiculite), although typically, it is preferable that the non-woven mat is non-intumescent (i.e., free of intumescent material (e.g., free of vermiculite)).

Non-woven mats described herein can be made, for example, using wet (typically wet-laid) or dry (typically dry-laid) process known in the art, although those as-made mounting mats (i.e., before any heating above 500° C.) comprising not greater than 5 (in some embodiments, not greater than 4, 3, 2, 1, 0.75, 0.5, 0.25, 0.1, or even zero) percent by weight organic material (e.g., binder), based on the total weight of the mat, are made via dry processing methods. Optionally, non-woven mats described herein can be heat-treated.

Some embodiments of non-woven mats described herein further comprise binder. The binders can be organic, inorganic, or combinations thereof. For non-woven mats comprising organic binders, during operating temperatures commonly encountered during use of pollution devices, the organic binders decompose, burn-off or otherwise eliminated. Thus, the organic constituents are typically transient or fugitive rather than permanent components of the non-woven mats.

Polymeric and other organic binders are particularly useful when a non-woven mat is made using a wet-laid or modified papermaking process; however, a non-woven mat made using a dry-laid process may also benefit from the incorporation of such binders. One or more organic binders may be incorporated into the body of a non-woven mat and/or used as a coating for the mat.

Suitable polymeric binders can be thermoplastic or thermoset, and can be provided as a solid in various forms, or as a liquid comprising a 100 percent solids composition, a solution, dispersion, a latex, an emulsion, combinations of these, and the like. In some embodiments, the polymeric binder is an elastomer. Suitable polymers include natural rubber, copolymers of two or more copolymerizable species including styrene and butadiene, copolymers of two or more copolymerizable species including butadiene and acrylonitrile, (meth) acrylate polymers and copolymers, polyurethanes, silicones, polyesters, polyamides, cellulosic polymers, other elastomer polymers, or combinations of these.

For non-woven mats including binder, exemplary amounts of binder (e.g., organic binder) include about 0.1 to about 15 percent by weight (in some embodiments, about 0.5 to about 12, or about 1 to about 10 percent by weight), on a dry weight basis.

In some embodiments, the polymer binders are acrylic- and/or methacrylate-containing latex compositions. Such latex compositions tend to burn cleanly without producing undesirable amounts of toxic or corrosive by-products. Examples of suitable acrylic emulsions include, but are not limited to, those commercially available under the trade designations "RHOPLEX HA-8" (a 44.5% by weight solids aqueous emulsion of acrylic copolymers) from Rohm and Haas, Philadelphia, Pa., and under the trade designation "AIRFLEX 600BP" (a 55% solids ethylene vinyl acetate copolymer) from Air Products, Allentown, Pa.

Polymeric fibers may also be used as a binder component in the compositions to improve the handling, flexibility, the resiliency, or a combination thereof, especially when the non-woven mat is made by a dry-laid process. The polymeric fibers tend to enhance processing and improve the strength of the non-woven mat. As with the polymeric binder, polymeric fibers tend to burn out (i.e., to decompose or be eliminated) after one or more heating cycles if the compositions are used in a pollution control device.

Exemplary polymeric fibers include thermoplastic fibers (e.g., polyolefin (e.g., polyethylene and polypropylene) fibers, polystyrene fibers, polyether fibers, polyester (e.g., polyethylene terephthalate (PET) and polybutalene terephthalate (PBT)) fibers, vinyl polymer (e.g., polyvinyl chloride and polyvinylidene fluoride) fibers, polyamides (e.g., polycaprolactame, polyurethanes, and nylon) fibers, and polyaramide fibers. Particularly useful fibers for thermal bonding in non-woven mats described herein include so-called bicomponent fibers which typically comprise polymers of different composition or with different physical properties. Typically, these fibers are core/sheath fibers where, for example, the polymeric component of the core provides structure and the sheath is meltable or thermoplastic enabling bonding of the fibers. For example, in one embodiment, the bicomponent fiber may be a core/sheath polyester/polyolefin fiber. Bicomponent fibers that can be used include those commercially available under the trade designation "TREVIRA 255" from Trevira GmbH, Bobingen, Germany, and "FIBERVISIONS CREATE WL" from FiberVisions, Varde, Denmark. Typically, if present, the amount of polymeric fiber is up to about 5 (in some embodiments, in a range from 1 to 5) weight percent polymeric fibers on a dry weight basis. The polymeric fibers may be staple fibers or fibrillated fibers. In one embodiment, the polymeric fibers are staple fibers in the range of about 0.5 denier to about 5 denier.

Suitable polymeric binders may be used alone or may be combined with additional components. Additional components may include monomers, plasticizers, fillers, tackifiers, surfactants, or other modifiers.

Suitable inorganic binder materials may include, colloidal particles; inorganic micaceous binders as disclosed, for example, in PCT Publication No. WO03/031368, published Apr. 17, 2003, the subject matter of which is hereby incorporated by reference in its entirety; and products commercially available from R.T. Vanderbilt Company, Inc., Norwalk, Conn., under the trade designation "DIXIE CLAY". When present in non-woven mats described herein, the micaceous binder as described in WO03/031368 is typically present in an amount of less than about 5 percent by weight (in some embodiments, less than about 2, or less than 1 percent by weight), based on a total dry weight of the non-woven mat. Most embodiments of the non-woven mats described herein are free of micaceous binder material.

Embodiments of mounting mats described herein can be made, for example, by feeding chopped, individualized fibers (e.g., about 2.5 cm to about 5 cm in length) into a lickerin roll equipped with pins such as that available from Laroche, Cours la ville, France and/or a conventional web-forming machine (commercially available, for example, under the trade designation "RANDO WEBBER" from Rando Machine Corp., Macedon, N.Y.; or "DAN WEB" from Scan-Web Co., Denmark), wherein the fibers are drawn onto a wire screen or mesh belt (e.g., a metal or nylon belt). If a "DAN WEB"-type web-forming machine is used, the fibers are preferably individualized using a hammer mill and then a blower. To facilitate ease of handling of the mat, the mat can be formed on or placed on a scrim.

Embodiments of mounting mats described herein can be also made, for example, using conventional wet-forming or textile carding. For wet forming processes, the fiber length is often from about 0.5 cm to about 6 cm.

In some embodiments, particularly with wet forming processes, binder is used to facilitate formation of the mat. In some embodiments, nonwoven mats described herein comprise not greater than 10 (in some embodiments not greater than 4, 3, 2, 1, 0.75, 0.5, 0.25, or even not greater than 0.1) percent by weight binder, based on the total weight of the mat, while others contain no binder.

Optionally, some embodiments of mounting mat described herein are needle-punched (i.e., where there is physical entanglement of fibers provided by multiple full or partial (in some embodiments, full) penetration of the mat, for example, by barbed needles). The nonwoven mat can be needle punched using a conventional needle punching apparatus (e.g., a needle puncher commercially available, for example, under the trade designation "DILO" from Dilo, Germany, with barbed needles (commercially available, for example, from Foster Needle Company, Inc., of Manitowoc, Wis. or Groz-Beckert Group, Germany)) to provide a needle-punched, nonwoven mat. Needle punching, which provides entanglement of the fibers, typically involves compressing the mat and then punching and drawing barbed needles through the mat. The efficacy of the physical entanglement of the fibers during needle punching is generally improved when the polymeric and/or bicomponent organic fibers previously mentioned are included in the mat construction. The improved entanglement can further increase tensile strength and improve handling of the nonwoven mat. The optimum number of needle punches per area of mat will vary depending on the particular application. Typically, the nonwoven mat is needle punched to provide about 5 to about 60 needle punches/cm$^2$ (in some embodiments, about 10 to about 20 needle punches/cm$^2$.

Optionally, some embodiments of mounting mat described herein are stitchbonded using conventional techniques (see e.g., U.S. Pat. No. 4,181,514 (Lefkowitz et al.), the disclosure of which is incorporated herein by reference for its teaching of stitchbonding nonwoven mats). Typically, the mat is stitchbonded with organic thread. A thin layer of an organic or inorganic sheet material can be placed on either or both sides of the mat during stitchbonding to prevent or minimize the threads from cutting through the mat. If it is desirable for the stitching thread to not decompose in use, an inorganic thread, (e.g., ceramic or metal (such as stainless steel) can be used. The spacing of the stitches is usually about 3 mm to about 30 mm so that the fibers are uniformly compressed throughout the entire area of the mat.

In some embodiments, mounting mats described herein have an as-made (i.e., before any heating above 50° C.) bulk density in a range from 0.05 g/cm$^3$ to 0.3 g/cm$^3$ (in some embodiments, in a range from 0.1 g/cm$^3$ to 0.25 g/cm$^3$). In another aspect, when the mounted, the mat typically has a mount density in a range from 0.2 g/cm$^3$ to 0.6 g/cm$^3$ (in other embodiments, in a range from 0.3 g/cm$^3$ to 0.5 g/cm$^3$ (i.e., the mat will be compressed when mounted)).

In some embodiments, the non-woven mat has a thickness in the range from 3 mm to 50 mm. In some embodiments, the non-woven mat has a tensile strength of at least 10 kPa, as determined as described in the Examples.

The metallic casing can be made from materials known in the art for such use, including stainless steel.

The nonwoven mat can be used as a thermal insulation material to insulate various components of an exhaust system including, for example, an exhaust pipe, the inlet or outlet end cone of a pollution control device or exhaust manifold of an internal combustion engine. Non-woven mats described herein are useful, for example, in pollution control devices. Pollution control device typically comprises pollution control element (e.g., catalytic converter, a diesel particulate filter or a selective catalytic reduction element) mounted in a casing with a non-woven mat described herein. In an exhaust system comprising a double walled exhaust component (e.g., an exhaust pipe, an end cone end cap, or other portion of a pollution control device, and/or an exhaust manifold) and the nonwoven mat described herein. The nonwoven mat can be mounted in the gap between the first outer wall and second inner wall of the double wall component. Exemplary mount densities are in a range from about 0.1 g/cm$^2$ to 0.6 g/cm$^2$.

Exemplary pollution control elements that can be mounted with mounting mat described herein include gasoline pollution control elements as well as diesel pollution control elements. The pollution control element may be a catalytic converter or a particulate filter or trap. Catalytic converters contain a catalyst, which is typically coated on a monolithic structure mounted within a metallic housing. The catalyst is typically adapted to be operative and effective at the requisite temperature. For example, for use with a gasoline engine the catalytic converter should typically be effective at a temperature in a range from 400° C. to 950° C., whereas for a diesel engine lower temperatures (typically not more than 350° C.) are common. The monolithic structures are typically ceramic, although metal monoliths are also sometimes used. The catalyst oxidizes carbon monoxide and hydrocarbons and reduces the oxides of nitrogen in exhaust gases to control atmospheric pollution. While in a gasoline engine all three of these pollutants can be reacted simultaneously in a so-called "three way converter", most diesel engines are equipped with only a diesel oxidation catalytic converter. Catalytic converters for reducing the oxides of nitrogen, which are only in limited use today for diesel engines, generally consist of a separate catalytic converter. Examples of pollution control elements for use with a gasoline engine include those made of cordierite that are commercially available from Corning Inc., Corning, N.Y. or NGK Insulators, LTD., Nagoya, Japan, or metal monoliths commercially available from Emitec, Lohmar, Germany.

Suitable selective catalytic reduction elements are available, for example, from Corning, Inc., Corning, N.Y.

Diesel particulate filters or traps are typically wall flow filters, which have honeycombed, monolithic structures typically made from porous crystalline ceramic materials. Alternate cells of the honeycombed structure are typically plugged such that exhaust gas enters in one cell and is forced through the porous wall to an adjacent cell where it can exit the structure. In this way, the small soot particles that are present in diesel exhaust gas are collected. Suitable diesel particulate filters made of cordierite are commercially available from Corning Inc. and NGK Insulators, Inc. Diesel particulate filters made of silicon carbide are commercially available from Ibiden Co. Ltd., Japan, and are described in, for example, JP 2002047070A, published Feb. 12, 2002.

Exemplary Embodiments

1. A non-woven mat comprised of a blend comprised of at least 60 percent by weight magnesium aluminum silicate glass fibers and at least 10 percent by weight fibers selected from the group consisting of amorphous refractory ceramic fibers, bio-soluble ceramic fibers, heat-treated silica fibers, and mixtures thereof, based on the total weight of the mat, wherein the magnesium aluminum silicate glass fibers comprise $Al_2O_3$ in a range from 10 to 30 percent by weight, $SiO_2$ in a range from 52 to 70 percent by weight, and MgO in a range from 1 to 12 percent by weight, based on the total weight of the magnesium aluminum silicate glass fiber, and wherein the non-woven mat is collectively comprised of at least 80 percent by weight of said magnesium aluminum silicate glass fibers and said fibers selected from the group consisting of amorphous refractory ceramic fibers, bio-soluble ceramic fibers, heat-treated silica fibers, and mixtures thereof, based on the total weight of the mat, and wherein the magnesium aluminum silicate glass fibers and the fibers selected from the group consisting of amorphous refractory ceramic fibers, bio-soluble ceramic fibers, heat-treated silica fibers, and mixtures thereof present in the blend collectively provide the non-woven mat with a Resiliency Value after three thermal cycles from 25° C. to 700° C./400° C. of the Real Condition Fixture Test at least 1.1 times greater than the Resiliency Value of a comparable non-woven mat consisting of any individual magnesium aluminum silicate glass fibers, amorphous refractory ceramic fibers, bio-soluble ceramic fibers, heat-treated silica fibers, present in the blend of fibers.

2. The non-woven mat according to embodiment 1 collectively comprising at least 85 percent by weight of said magnesium aluminum silicate glass fibers and said fibers selected from the group consisting of amorphous refractory ceramic fibers, bio-soluble ceramic fibers, heat-treated silica fibers, and mixtures thereof.

3. The non-woven mat according to embodiment 1 collectively comprising at least 90 percent by weight of said magnesium aluminum silicate glass fibers and said fibers selected from the group consisting of amorphous refractory ceramic fibers, bio-soluble ceramic fibers, heat-treated silica fibers, and mixtures thereof.

4. The non-woven mat according to embodiment 1 collectively comprising at least 95 percent by weight of said magnesium aluminum silicate glass fibers and said fibers selected from the group consisting of amorphous refractory ceramic fibers, bio-soluble ceramic fibers, heat-treated silica fibers, and mixtures thereof.

5. The non-woven mat according to embodiment 1 collectively comprising at least 99 percent by weight of said magnesium aluminum silicate glass fibers and said fibers selected from the group consisting of amorphous refractory ceramic fibers, bio-soluble ceramic fibers, heat-treated silica fibers, and mixtures thereof.

6. The non-woven mat according to embodiment 1 collectively comprising at least 100 percent by weight of said magnesium aluminum silicate glass fibers and said fibers selected from the group consisting of amorphous refractory ceramic fibers, bio-soluble ceramic fibers, heat-treated silica fibers, and mixtures thereof.

7. The non-woven mat according to embodiment 1 collectively comprising at least 80 percent by weight of said magnesium aluminum silicate glass fibers and said amorphous refractory ceramic fibers.

8. The non-woven mat according to embodiment 1 collectively comprising at least 85 percent by weight of said magnesium aluminum silicate glass fibers and said amorphous refractory ceramic fibers.

9. The non-woven mat according to embodiment 1 collectively comprising at least 90 percent by weight of said magnesium aluminum silicate glass fibers and said amorphous refractory ceramic fibers.

10. The non-woven mat according to embodiment 1 collectively comprising at least 95 percent by weight of said magnesium aluminum silicate glass fibers and said amorphous refractory ceramic fibers.

11. The non-woven mat according to embodiment 1 collectively comprising at least 99 percent by weight of said magnesium aluminum silicate glass fibers and said amorphous refractory ceramic fibers.

12. The non-woven mat according to embodiment 1 collectively comprising at least 100 percent by weight of said magnesium aluminum silicate glass fibers and said amorphous refractory ceramic fibers.

13. The non-woven mat according to embodiment 1 collectively comprising at least 80 percent by weight of said magnesium aluminum silicate glass fibers and said bio-soluble ceramic fibers.

14. The non-woven mat according to embodiment 1 collectively comprising at least 85 percent by weight of said magnesium aluminum silicate glass fibers and bio-soluble ceramic fibers.

15. The non-woven mat according to embodiment 1 collectively comprising at least 90 percent by weight of said magnesium aluminum silicate glass fibers and bio-soluble ceramic fibers.

16. The non-woven mat according to embodiment 1 collectively comprising at least 95 percent by weight of said magnesium aluminum silicate glass fibers and bio-soluble ceramic fibers.

17. The non-woven mat according to embodiment 1 collectively comprising at least 99 percent by weight of said magnesium aluminum silicate glass fibers and bio-soluble ceramic fibers.

18. The non-woven mat according to embodiment 1 collectively comprising at least 100 percent by weight of said magnesium aluminum silicate glass fibers and bio-soluble ceramic fibers.

19. The non-woven mat according to embodiment 1 collectively comprising at least 80 percent by weight of said magnesium aluminum silicate glass fibers and said heat-treated silica fibers.

20. The non-woven mat according to embodiment 1 collectively comprising at least 85 percent by weight of said magnesium aluminum silicate glass fibers and said heat-treated silica fibers.

21. The non-woven mat according to embodiment 1 collectively comprising at least 90 percent by weight of said magnesium aluminum silicate glass fibers and said heat-treated silica fibers.

22. The non-woven mat according to embodiment 1 collectively comprising at least 95 percent by weight of said magnesium aluminum silicate glass fibers and said heat-treated silica fibers.

23. The non-woven mat according to embodiment 1 collectively comprising at least 99 percent by weight of said magnesium aluminum silicate glass fibers and said heat-treated silica fibers.

24. The non-woven mat according to embodiment 1 collectively comprising at least 100 percent by weight of said magnesium aluminum silicate glass fibers and said heat-treated silica fibers.

25. The non-woven mat according to any of embodiments 1 to 24, wherein the magnesium aluminum silicate glass fibers and the fibers selected from the group consisting of amorphous refractory ceramic fibers, bio-soluble ceramic fibers, heat-treated silica fibers, and mixtures thereof present in the blend collectively provide the non-woven mat with a Resiliency Value after three thermal cycles from 25° C. to 700° C./400° C. of the Real Condition Fixture Test at least 1.2 times greater than the Resiliency Value of a comparable non-woven mat consisting of any individual magnesium aluminum silicate glass fibers, amorphous refractory ceramic fibers, bio-soluble ceramic fibers, heat-treated silica fibers, present in the blend of fibers.

26. The non-woven mat according to any of embodiments 1 to 25, wherein the magnesium aluminum silicate glass fibers and the fibers selected from the group consisting of amorphous refractory ceramic fibers, bio-soluble ceramic fibers, heat-treated silica fibers, and mixtures thereof present in the blend collectively provide the non-woven mat with a Resiliency Value after three thermal cycles from 25° C. to 700° C./400° C. of the Real Condition Fixture Test at least 1.25 times greater than the Resiliency Value of a comparable non-woven mat consisting of any individual type of fibers comprising the non-woven mat comprised of the blend of fibers.

27. The non-woven mat according to any of embodiments 1 to 26, wherein the magnesium aluminum silicate glass fibers and the fibers selected from the group consisting of amorphous refractory ceramic fibers, bio-soluble ceramic fibers, heat-treated silica fibers, and mixtures thereof present in the blend collectively provide the non-woven mat with a Resiliency Value after three thermal cycles from 25° C. to 700° C./400° C. of the Real Condition Fixture Test at least 1.3 times greater than the Resiliency Value of a comparable non-woven mat consisting of any individual type of fibers comprising the non-woven mat comprised of the blend of fibers.

28. The non-woven mat according to any of embodiments 1 to 27, wherein the magnesium aluminum silicate glass fibers and the fibers selected from the group consisting of amorphous refractory ceramic fibers, bio-soluble ceramic fibers, heat-treated silica fibers, and mixtures thereof present in the blend collectively provide the non-woven mat with a Resiliency Value after three thermal cycles from 25° C. to 700° C./400° C. of the Real Condition Fixture Test at least 1.4 times greater than the Resiliency Value of a comparable non-woven mat consisting of any individual type of fibers comprising the non-woven mat comprised of the blend of fibers.

29. The non-woven mat according to any of embodiments 1 to 28, wherein the magnesium aluminum silicate glass fibers and the fibers selected from the group consisting of amorphous refractory ceramic fibers, bio-soluble ceramic fibers, heat-treated silica fibers, and mixtures thereof present in the blend collectively provide the non-woven mat with a Resiliency Value after three thermal cycles from 25° C. to 700° C./400° C. of the Real Condition Fixture Test at least 1.5 times greater than the Resiliency Value of a comparable non-woven mat consisting of any individual type of fibers comprising the non-woven mat comprised of the blend of fibers.

30. The non-woven mat according to any of embodiments 1 to 29, wherein the magnesium aluminum silicate glass fibers and the fibers selected from the group consisting of amorphous refractory ceramic fibers, bio-soluble ceramic fibers, heat-treated silica fibers, and mixtures thereof present in the blend collectively provide the non-woven mat with a Resiliency Value after three thermal cycles from 25° C. to 700° C./400° C. of the Real Condition Fixture Test at least 1.6 times greater than the Resiliency Value of a comparable non-woven mat consisting of any individual type of fibers comprising the non-woven mat comprised of the blend of fibers.

31. The non-woven mat according to any of embodiments 1 to 30, wherein the magnesium aluminum silicate glass fibers and the fibers selected from the group consisting of amorphous refractory ceramic fibers, bio-soluble ceramic fibers, heat-treated silica fibers, and mixtures thereof present in the blend collectively provide the non-woven mat with a Resiliency Value after three thermal cycles from 25° C. to 700° C./400° C. of the Real Condition Fixture Test at least 1.7 times greater than the Resiliency Value of a comparable non-woven mat consisting of any individual type of fibers comprising the non-woven mat comprised of the blend of fibers.

32. The non-woven mat according to any of embodiments 1 to 31, wherein the magnesium aluminum silicate glass fibers and the fibers selected from the group consisting of amorphous refractory ceramic fibers, bio-soluble ceramic fibers, heat-treated silica fibers, and mixtures thereof present in the blend collectively provide the non-woven mat with a Resiliency Value after three thermal cycles from 25° C. to 700° C./400° C. of the Real Condition Fixture Test at least 1.75 times greater than the Resiliency Value of a comparable non-woven mat consisting of any individual type of fibers comprising the non-woven mat comprised of the blend of fibers.

33. The non-woven mat according to any of embodiments 1 to 32, wherein the magnesium aluminum silicate glass fibers and the fibers selected from the group consisting of amorphous refractory ceramic fibers, bio-soluble ceramic fibers, heat-treated silica fibers, and mixtures thereof present in the blend collectively provide the non-woven mat with a Resiliency Value after three thermal cycles from 25° C. to 700° C./400° C. of the Real Condition Fixture Test at least 1.8 times greater than the Resiliency Value of a comparable non-woven mat consisting of any individual type of fibers comprising the non-woven mat comprised of the blend of fibers.

34. The non-woven mat according to any of embodiments 1 to 33, wherein the blend of fibers comprises at least one of the amorphous refractory fiber or the bio-soluble fibers.

35. The non-woven mat according to any of embodiments 1 to 34, wherein the mat comprises at least 70 percent by weight of the magnesium aluminum silicate glass fibers based on the total weight of the mat.

36. The non-woven mat according to any of embodiments 1 to 34, wherein the mat comprises at least 75 percent by weight of the magnesium aluminum silicate glass fibers based on the total weight of the mat.

37. The non-woven mat according to any of embodiments 1 to 34, wherein the mat comprises at least 80 percent by weight of the magnesium aluminum silicate glass fibers based on the total weight of the mat.

38. The non-woven mat according to any of embodiments 1 to 34, wherein the mat comprises at least 85 percent by weight of the magnesium aluminum silicate glass fibers based on the total weight of the mat.

39. The non-woven mat according to any of embodiments 1 to 34, wherein the mat comprises at least 90 percent by weight of the magnesium aluminum silicate glass fibers based on the total weight of the mat.

40. The non-woven mat according to any of embodiments 1 to 39, wherein the mat comprises at least 15 percent by weight of the fibers selected from the group consisting of amorphous refractory ceramic fibers, bio-soluble ceramic fibers, heat-treated silica fibers, and mixtures thereof based on the total weight of the mat.

41. The non-woven mat according to any of embodiments 1 to 39, wherein the mat comprises at least 20 percent by weight of the fibers selected from the group consisting of amorphous refractory ceramic fibers, bio-soluble ceramic fibers, heat-treated silica fibers, and mixtures thereof based on the total weight of the mat.

42. The non-woven mat according to any of embodiments 1 to 39, wherein the mat comprises at least 25 percent by weight of the fibers selected from the group consisting of amorphous refractory ceramic fibers, bio-soluble ceramic fibers, heat-treated silica fibers, and mixtures thereof based on the total weight of the mat.

43. The non-woven mat according to any of embodiments 1 to 39, wherein the mat comprises at least 30 percent by weight of the fibers selected from the group consisting of amorphous refractory ceramic fibers, bio-soluble ceramic fibers, heat-treated silica fibers, and mixtures thereof based on the total weight of the mat.

44. The non-woven mat according to any of embodiments 1 to 39, wherein the mat comprises at least 35 percent by weight of the fibers selected from the group consisting of amorphous refractory ceramic fibers, bio-soluble ceramic fibers, heat-treated silica fibers, and mixtures thereof based on the total weight of the mat.

45. The non-woven mat according to any of embodiments 1 to 39, wherein the mat comprises at least 40 percent by weight of the fibers selected from the group consisting of amorphous refractory ceramic fibers, bio-soluble ceramic fibers, heat-treated silica fibers, and mixtures thereof based on the total weight of the mat.

46. The non-woven mat according to any of embodiments 1 to 45, wherein the non-woven mat is needled-punched.

47. The non-woven mat according to any of embodiments 1 to 46, wherein the non-woven mat is made via a wet-laid process.

48. The non-woven mat according to any of embodiments 1 to 46, wherein the non-woven mat is made via a dry-laid process.

49. The non-woven mat according to embodiment 48, wherein the non-woven mat as-made prior to heating above 500° C. contains not greater than 5 percent by weight organic material, based on the total weight of the mat.

50. The non-woven mat according to embodiment 48, wherein the non-woven mat as-made prior to heating above 500° C. contains not greater than 4 percent by weight organic material, based on the total weight of the mat.

51. The non-woven mat according to embodiment 48, wherein the non-woven mat as-made prior to heating above 500° C. contains not greater than 3 percent by weight organic material, based on the total weight of the mat.

52. The non-woven mat according to embodiment 48, wherein the non-woven mat as-made prior to heating above 500° C. contains not greater than 2 percent by weight organic material, based on the total weight of the mat.

53. The non-woven mat according to embodiment 48, wherein the non-woven mat as-made prior to heating above 500° C. contains not greater than 1 percent by weight organic material, based on the total weight of the mat.

54. The non-woven mat according to embodiment 48, wherein the non-woven mat as-made prior to heating above 500° C. contains not greater than 0.75 percent by weight organic material, based on the total weight of the mat.

55. The non-woven mat according to embodiment 48, wherein the non-woven mat as-made prior to heating above 500° C. contains not greater than 0.5 percent by weight organic material, based on the total weight of the mat.

56. The non-woven mat according to embodiment 48, wherein the non-woven mat as-made prior to heating above 500° C. contains not greater than 0.25 percent by weight organic material, based on the total weight of the mat.

57. The non-woven mat according to embodiment 48, wherein the non-woven mat as-made prior to heating above 500° C. contains not greater than 0.1 percent by weight organic material, based on the total weight of the mat.

58. The non-woven mat according to embodiment 48, wherein the non-woven mat as-made prior to heating above 500° C. contains zero percent by weight organic material, based on the total weight of the mat.

59. The non-woven mat according to any of embodiments 1 to 58, wherein the non-woven mat has an as-made bulk density in a range from 0.05 g/cm$^3$ to 0.3 g/cm$^3$.

60. The non-woven mat according to any of embodiments 1 to 59, wherein the magnesium aluminum silicate glass fibers are selected from the group consisting of E-glass fibers, S-glass fibers, S-2 glass fibers, R-glass fibers, and mixture thereof.

61. The non-woven mat according to any of embodiments 1 to 60, wherein the amorphous refractory ceramic is an aluminosilicate.

62. The non-woven mat according to any of embodiments 1 to 61, wherein the bio-soluble ceramic is at least one of magnesium silicate or calcium magnesium silicate.

63. The non-woven mat according to any of embodiments 1 to 62, wherein the non-woven mat has a thickness in the range from 3 mm to 50 mm.

64. The non-woven mat according to any of embodiments 1 to 63, wherein the non-woven mat has a tensile strength of at least 10 kPa.

65. The non-woven mat according to any of embodiments 1 to 64, wherein the magnesium aluminum silicate fibers have diameters of at least 5 micrometers.

66. The non-woven mat according to any of embodiments 1 to 65, wherein the magnesium aluminum silicate fibers are shot-free.

67. The non-woven mat according to any of embodiments 1 to 66, wherein the non-woven mat comprises not greater than 5 percent by weight organic material, based on the total weight of the mat.

68. The non-woven mat according to embodiment 67, further comprising binder.

69. The non-woven mat according to any of embodiments 1 to 68, wherein the non-woven mat is non-intumescent.

70. The non-woven mat according to any of embodiments 1 to 69, wherein the non-woven mat is free of vermiculite.

71. A pollution control device comprising a pollution control element mounted in a casing with the mat according to any of embodiments 1 to 70.

72. The pollution control device according to embodiment 71, wherein the pollution element is one of a catalytic converter, a diesel particulate filter or a selective catalytic reduction element.

73. An exhaust system comprising a double walled exhaust component and the mat according to any of embodiments 1 to 70, wherein the mat is positioned in a gap between the walls of the double wall exhaust component.

74. The exhaust system according to embodiment 73, wherein the double walled exhaust component is an exhaust pipe.

75. The exhaust system according to embodiment 73, wherein the double walled exhaust component is an end cone of a pollution control device.

76. The exhaust system according to embodiment 73, wherein the double walled exhaust component is an end cap of a pollution control device.

77. The exhaust system according to embodiment 73, wherein the double walled exhaust component is an exhaust manifold.

78. A non-woven mat comprised of a blend comprised of at least 60 percent by weight magnesium aluminum silicate glass fibers and at least 10 percent by weight bio-soluble ceramic fibers, wherein the magnesium aluminum silicate glass fibers comprise $Al_2O_3$ in a range from 10 to 30 percent by weight, $SiO_2$ in a range from 52 to 70 percent by weight, and MgO in a range from 1 to 12 percent by weight, based on the total weight of the magnesium aluminum silicate glass fiber, wherein the weight percentages of $Al_2O_3$, $SiO_2$, and MgO, and wherein the non-woven mat is collectively comprised of at least 80 percent by weight of said magnesium aluminum silicate glass fibers and said bio-soluble ceramic fibers, based on the total weight of the mat.

79. The non-woven mat according to embodiment 78 collectively comprising at least 85 percent by weight of said magnesium aluminum silicate glass fibers and said fibers bio-soluble ceramic fibers.

80. The non-woven mat according to embodiment 78 collectively comprising at least 90 percent by weight of said magnesium aluminum silicate glass fibers and said bio-soluble ceramic fibers.

81. The non-woven mat according to embodiment 78 collectively comprising at least 95 percent by weight of said magnesium aluminum silicate glass fibers and said bio-soluble ceramic fibers.

82. The non-woven mat according to embodiment 78 collectively comprising at least 99 percent by weight of said magnesium aluminum silicate glass fibers and said bio-soluble ceramic fibers.

83. The non-woven mat according to embodiment 78 collectively comprising at least 100 percent by weight of said magnesium aluminum silicate glass fibers and said bio-soluble ceramic fibers.

84. The non-woven mat according to any of embodiments 79 to 83, wherein the magnesium aluminum silicate glass fibers and the bio-soluble ceramic fibers present in the blend collectively provide the non-woven mat with a Resiliency Value after three thermal cycles from 25° C. to 700° C./400° C. of the Real Condition Fixture Test at least 1.1 times greater than the Resiliency Value of a comparable non-woven mat consisting of any individual magnesium aluminum silicate glass fibers and bio-soluble ceramic fibers present in the blend of fibers.

85. The non-woven mat according to any of embodiments 79 to 83, wherein the magnesium aluminum silicate glass fibers and the bio-soluble ceramic fibers present in the blend collectively provide the non-woven mat with a Resiliency Value after three thermal cycles from 25° C. to 700° C./400° C. of the Real Condition Fixture Test at least 1.2 times greater than the Resiliency Value of a comparable non-woven mat consisting of any individual magnesium aluminum silicate glass fibers and bio-soluble ceramic fibers present in the blend of fibers.

86. The non-woven mat according to any of embodiments 79 to 83, wherein the magnesium aluminum silicate glass fibers and the bio-soluble ceramic fibers present in the blend collectively provide the non-woven mat with a Resiliency Value after three thermal cycles from 25° C. to 700° C./400° C. of the Real Condition Fixture Test at least 1.25 times greater than the Resiliency Value of a comparable non-woven mat consisting of any individual magnesium aluminum silicate glass fibers and bio-soluble ceramic fibers present in the blend of fibers.

87. The non-woven mat according to any of embodiments 79 to 83, wherein the magnesium aluminum silicate glass fibers and the bio-soluble ceramic fibers present in the blend collectively provide the non-woven mat with a Resiliency Value after three thermal cycles from 25° C. to 700° C./400° C. of the Real Condition Fixture Test at least 1.3 times greater than the Resiliency Value of a comparable non-woven mat consisting of any individual magnesium aluminum silicate glass fibers and bio-soluble ceramic fibers present in the blend of fibers.

88. The non-woven mat according to any of embodiments 79 to 83, wherein the magnesium aluminum silicate glass fibers and the bio-soluble ceramic fibers present in the blend collectively provide the non-woven mat with a Resiliency Value after three thermal cycles from 25° C. to 700° C./400° C. of the Real Condition Fixture Test at least 1.4 times greater than the Resiliency Value of a comparable non-woven mat consisting of any individual magnesium aluminum silicate glass fibers and bio-soluble ceramic fibers present in the blend of fibers.

89. The non-woven mat according to any of embodiments 79 to 83, wherein the magnesium aluminum silicate glass fibers and the bio-soluble ceramic fibers present in the blend collectively provide the non-woven mat with a Resiliency Value after three thermal cycles from 25° C. to 700° C./400° C. of the Real Condition Fixture Test at least 1.5 times greater than the Resiliency Value of a comparable non-woven mat consisting of any individual magnesium aluminum silicate glass fibers and bio-soluble ceramic fibers present in the blend of fibers.

90. The non-woven mat according to any of embodiments 79 to 83, wherein the magnesium aluminum silicate glass fibers and the bio-soluble ceramic fibers present in the blend collectively provide the non-woven mat with a Resiliency Value after three thermal cycles from 25° C. to 700° C./400° C. of the Real Condition Fixture Test at least 1.6 times greater than the Resiliency Value of a comparable non-woven mat consisting of any individual magnesium aluminum silicate glass fibers and bio-soluble ceramic fibers present in the blend of fibers.

91. The non-woven mat according to any of embodiments 79 to 83, wherein the magnesium aluminum silicate glass fibers and the bio-soluble ceramic fibers present in the blend collectively provide the non-woven mat with a Resiliency Value after three thermal cycles from 25° C. to 700° C./400° C. of the Real Condition Fixture Test at least 1.7 times greater than the Resiliency Value of a comparable non-woven mat consisting of any individual magnesium aluminum silicate glass fibers and bio-soluble ceramic fibers present in the blend of fibers.

92. The non-woven mat according to any of embodiments 79 to 83, wherein the magnesium aluminum silicate glass fibers and the bio-soluble ceramic fibers present in the blend collectively provide the non-woven mat with a Resiliency Value after three thermal cycles from 25° C. to 700° C./400° C. of the Real Condition Fixture Test at least 1.75 times greater than the Resiliency Value of a comparable non-woven mat consisting of any individual magnesium aluminum silicate glass fibers and bio-soluble ceramic fibers present in the blend of fibers.

93. The non-woven mat according to any of embodiments 79 to 83, wherein the magnesium aluminum silicate glass fibers and the bio-soluble ceramic fibers present in the blend collectively provide the non-woven mat with a Resiliency Value after three thermal cycles from 25° C. to 700° C./400° C. of the Real Condition Fixture Test at least 1.8 times greater than the Resiliency Value of a comparable non-woven mat consisting of any individual magnesium aluminum silicate glass fibers and bio-soluble ceramic fibers present in the blend of fibers.

94. The non-woven mat according to any of embodiments 79 to 93, wherein the mat comprises at least 70 percent by weight of the magnesium aluminum silicate glass fibers based on the total weight of the mat.

95. The non-woven mat according to any of embodiments 79 to 93, wherein the mat comprises at least 75 percent by weight of the magnesium aluminum silicate glass fibers based on the total weight of the mat.

96. The non-woven mat according to any of embodiments 79 to 93, wherein the mat comprises at least 80 percent by weight of the magnesium aluminum silicate glass fibers based on the total weight of the mat.

97. The non-woven mat according to any of embodiments 79 to 93, wherein the mat comprises at least 85 percent by weight of the magnesium aluminum silicate glass fibers based on the total weight of the mat.

98. The non-woven mat according to any of embodiments 79 to 93, wherein the mat comprises at least 90 percent by weight of the magnesium aluminum silicate glass fibers based on the total weight of the mat.

99. The non-woven mat according to any of embodiments 79 to 98, wherein the mat comprises at least 15 percent by weight of the bio-soluble ceramic fibers, based on the total weight of the mat.

100. The non-woven mat according to any of embodiments 79 to 98, wherein the mat comprises at least 20 percent by weight of the bio-soluble ceramic fibers, based on the total weight of the mat.

101. The non-woven mat according to any of embodiments 79 to 98, wherein the mat comprises at least 25 percent by weight of the bio-soluble ceramic fibers, based on the total weight of the mat.

102. The non-woven mat according to any of embodiments 79 to 98, wherein the mat comprises at least 30 percent by weight of the bio-soluble ceramic fibers, based on the total weight of the mat.

103. The non-woven mat according to any of embodiments 79 to 98, wherein the mat comprises at least 35 percent by weight of the bio-soluble ceramic fibers, based on the total weight of the mat.

104. The non-woven mat according to any of embodiments 79 to 98, wherein the mat comprises at least 40 percent by weight of the bio-soluble ceramic fibers, based on the total weight of the mat.

105. The non-woven mat according to any of embodiments 79 to 104, wherein the non-woven mat is needled-punched.

106. The non-woven mat according to any of embodiments 79 to 105, wherein the non-woven mat is made via a wet-laid process.

107. The non-woven mat according to any of embodiments 79 to 105, wherein the non-woven mat is made via a dry-laid process.

108. The non-woven mat according to embodiment 107, wherein the non-woven mat as-made prior to heating above 500° C. contains not greater than 5 percent by weight organic material, based on the total weight of the mat.

109. The non-woven mat according to embodiment 107, wherein the non-woven mat as-made prior to heating above 500° C. contains not greater than 4 percent by weight organic material, based on the total weight of the mat.

110. The non-woven mat according to embodiment 107, wherein the non-woven mat as-made prior to heating above 500° C. contains not greater than 3 percent by weight organic material, based on the total weight of the mat.

111. The non-woven mat according to embodiment 107, wherein the non-woven mat as-made prior to heating above 500° C. contains not greater than 2 percent by weight organic material, based on the total weight of the mat.

112. The non-woven mat according to embodiment 107, wherein the non-woven mat as-made prior to heating above 500° C. contains not greater than 1 percent by weight organic material, based on the total weight of the mat.

113. The non-woven mat according to embodiment 107, wherein the non-woven mat as-made prior to heating above 500° C. contains not greater than 0.75 percent by weight organic material, based on the total weight of the mat.

114. The non-woven mat according to embodiment 107, wherein the non-woven mat as-made prior to heating above 500° C. contains not greater than 0.5 percent by weight organic material, based on the total weight of the mat.

115. The non-woven mat according to embodiment 107, wherein the non-woven mat as-made prior to heating above 500° C. contains not greater than 0.25 percent by weight organic material, based on the total weight of the mat.

116. The non-woven mat according to embodiment 107, wherein the non-woven mat as-made prior to heating above 500° C. contains not greater than 0.1 percent by weight organic material, based on the total weight of the mat.

117. The non-woven mat according to embodiment 107, wherein the non-woven mat as-made prior to heating above 500° C. contains zero percent by weight organic material, based on the total weight of the mat.

118. The non-woven mat according to any of embodiments 79 to 117, wherein the non-woven mat has an as-made bulk density in a range from 0.05 g/cm$^3$ to 0.3 g/cm$^3$.

119. The non-woven mat according to any of embodiments 79 to 118, wherein the magnesium aluminum silicate glass fibers are selected from the group consisting of E-glass fibers, S-glass fibers, S-2 glass fibers, R-glass fibers, and mixture thereof 120. The non-woven mat according to any of embodiments 79 to 119, wherein the bio-soluble ceramic is at least one of magnesium silicate or calcium magnesium silicate.

121. The non-woven mat according to any of embodiments 79 to 120, wherein the non-woven mat has a thickness in the range from 3 mm to 50 mm.

122. The non-woven mat according to any of embodiments 79 to 121, wherein the non-woven mat has a tensile strength of at least 10 kPa.

123. The non-woven mat according to any of embodiments 79 to 122, wherein the magnesium aluminum silicate fibers have diameters of at least 5 micrometers.

124. The non-woven mat according to any of embodiments 79 to 123, wherein the magnesium aluminum silicate fibers are shot-free.

125. The non-woven mat according to any of embodiments 79 to 124, wherein the non-woven mat comprises not greater than 5 percent by weight organic material, based on the total weight of the mat.

126. The non-woven mat according to embodiment 125, further comprising binder.

127. The non-woven mat according to any of embodiments 79 to 126, wherein the non-woven mat is non-intumescent.

128. The non-woven mat according to any of embodiments 79 to 127, wherein the non-woven mat is free of vermiculite.

129. A pollution control device comprising a pollution control element mounted in a casing with the mat according to any of embodiments 79 to 128.

130. The pollution control device according to embodiment 129, wherein the pollution element is one of a catalytic converter, a diesel particulate filter or a selective catalytic reduction element.

131. An exhaust system comprising a double walled exhaust component and the mat according to any of embodiments any of embodiments 79 to 128, wherein the mat is positioned in a gap between the walls of the double wall exhaust component.

132. The exhaust system according to embodiment 131, wherein the double walled exhaust component is an exhaust pipe.

133. The exhaust system according to embodiment 131, wherein the double walled exhaust component is an end cone of a pollution control device.

134. The exhaust system according to embodiment 131, wherein the double walled exhaust component is an end cone of a pollution control device.

135. The exhaust system according to embodiment 131, wherein the double walled exhaust component is an exhaust manifold.

136. A non-woven mat comprised of a blend comprised of at least 60 percent by weight magnesium aluminum silicate glass fibers and at least 10 percent by weight heat-treated silica fibers, wherein the magnesium aluminum silicate glass fibers comprise $Al_2O_3$ in a range from 10 to 30 percent by weight, $SiO_2$ in a range from 52 to 70 percent by weight, and MgO in a range from 1 to 12 percent by weight, based on the total weight of the magnesium aluminum silicate glass fiber, wherein the weight percentages of $Al_2O_3$, $SiO_2$, and MgO, and wherein the non-woven mat is collectively comprised of at least 80 percent by weight of said magnesium aluminum silicate glass fibers and said heat-treated silica fibers, based on the total weight of the mat.

137. The non-woven mat according to embodiment 136 collectively comprising at least 85 percent by weight of said magnesium aluminum silicate glass fibers and said heat-treated silica fibers.

138. The non-woven mat according to embodiment 136 collectively comprising at least 90 percent by weight of said magnesium aluminum silicate glass fibers and said heat-treated silica fibers.

139. The non-woven mat according to embodiment 136 collectively comprising at least 95 percent by weight of said magnesium aluminum silicate glass fibers and said heat-treated silica fibers.

140. The non-woven mat according to embodiment 136 collectively comprising at least 99 percent by weight of said magnesium aluminum silicate glass fibers and said heat-treated silica fibers.

141. The non-woven mat according to embodiment 136 collectively comprising at least 100 percent by weight of said magnesium aluminum silicate glass fibers and said heat-treated silica fibers.

142. The non-woven mat according to any of embodiments 136 to 141, wherein the magnesium aluminum silicate glass fibers and the heat-treated silica fibers present in the blend collectively provide the non-woven mat with a Resiliency Value after three thermal cycles from 25° C. to 700° C./400° C. of the Real Condition Fixture Test at least 1.1 times greater than the Resiliency Value of a comparable non-woven mat consisting of any individual magnesium aluminum silicate glass fibers and heat-treated silica fibers present in the blend of fibers.

143. The non-woven mat according to any of embodiments 136 to 141, wherein the magnesium aluminum silicate glass fibers and the heat-treated silica fibers present in the blend collectively provide the non-woven mat with a Resiliency Value after three thermal cycles from 25° C. to 700° C./400° C. of the Real Condition Fixture Test at least 1.2 times greater than the Resiliency Value of a comparable non-woven mat consisting of any individual magnesium aluminum silicate glass fibers and heat-treated silica fibers present in the blend of fibers.

144. The non-woven mat according to any of embodiments 136 to 141, wherein the magnesium aluminum silicate glass fibers and the heat-treated silica fibers present in the blend collectively provide the non-woven mat with a Resiliency Value after three thermal cycles from 25° C. to 700° C./400° C. of the Real Condition Fixture Test at least 1.25 times greater than the Resiliency Value of a comparable non-woven mat consisting of any individual magnesium aluminum silicate glass fibers and heat-treated leached s present in the blend of fibers.

145. The non-woven mat according to any of embodiments 136 to 141, wherein the magnesium aluminum silicate glass fibers and the heat-treated silica fibers present in the blend collectively provide the non-woven mat with a Resiliency Value after three thermal cycles from 25° C. to 700° C./400° C. of the Real Condition Fixture Test at least 1.3 times greater than the Resiliency Value of a comparable non-woven mat consisting of any individual magnesium aluminum silicate glass fibers and heat-treated silica fibers present in the blend of fibers.

146. The non-woven mat according to any of embodiments 136 to 141, wherein the magnesium aluminum silicate glass fibers and the heat-treated silica fibers present in the blend collectively provide the non-woven mat with a Resiliency Value after three thermal cycles from 25° C. to 700° C./400° C. of the Real Condition Fixture Test at least 1.4 times greater than the Resiliency Value of a comparable non-woven mat consisting of any individual magnesium aluminum silicate glass fibers and heat-treated silica fibers present in the blend of fibers.

147. The non-woven mat according to any of embodiments 136 to 141, wherein the magnesium aluminum silicate glass fibers and the heat-treated silica fibers present in the blend collectively provide the non-woven mat with a Resiliency Value after three thermal cycles from 25° C. to 700° C./400° C. of the Real Condition Fixture Test at least 1.5 times greater than the Resiliency Value of a comparable non-woven mat consisting of any individual magnesium aluminum silicate glass fibers and heat-treated silica fibers present in the blend of fibers.

148. The non-woven mat according to any of embodiments 136 to 141, wherein the magnesium aluminum silicate glass fibers and the heat-treated silica fibers present in the blend collectively provide the non-woven mat with a Resiliency Value after three thermal cycles from 25° C. to 700° C./400° C. of the Real Condition Fixture Test at least 1.6 times greater than the Resiliency Value of a comparable non-woven mat consisting of any individual magnesium aluminum silicate glass fibers and heat-treated silica fibers present in the blend of fibers.

149. The non-woven mat according to any of embodiments 136 to 141, wherein the magnesium aluminum silicate glass fibers and the heat-treated silica fibers present in the blend collectively provide the non-woven mat with a Resiliency Value after three thermal cycles from 25° C. to 700° C./400° C. of the Real Condition Fixture Test at least 1.7 times greater than the Resiliency Value of a comparable non-woven mat consisting of any individual magnesium aluminum silicate glass fibers and heat-treated silica fibers present in the blend of fibers.

150. The non-woven mat according to any of embodiments 136 to 141, wherein the magnesium aluminum silicate glass fibers and the heat-treated silica fibers present in the blend collectively provide the non-woven mat with a Resiliency Value after three thermal cycles from 25° C. to 700° C./400° C. of the Real Condition Fixture Test at least 1.75 times greater than the Resiliency Value of a comparable non-woven mat consisting of any individual magnesium aluminum silicate glass fibers and heat-treated silica fibers present in the blend of fibers.

151. The non-woven mat according to any of embodiments 134 to 139, wherein the magnesium aluminum silicate glass fibers and the heat-treated silica fibers present in the blend collectively provide the non-woven mat with a Resiliency Value after three thermal cycles from 25° C. to 700° C./400° C. of the Real Condition Fixture Test at least 1.8 times greater than the Resiliency Value of a comparable non-woven mat consisting of any individual magnesium aluminum silicate glass fibers and heat-treated silica fibers present in the blend of fibers.

152. The non-woven mat according to any of embodiments 134 to 149, wherein the mat comprises at least 70 percent by weight of the magnesium aluminum silicate glass fibers based on the total weight of the mat.

153. The non-woven mat according to any of embodiments 134 to 149, wherein the mat comprises at least 75 percent by weight of the magnesium aluminum silicate glass fibers based on the total weight of the mat.

154. The non-woven mat according to any of embodiments 134 to 149, wherein the mat comprises at least 80 percent by weight of the magnesium aluminum silicate glass fibers based on the total weight of the mat.

155. The non-woven mat according to any of embodiments 134 to 149, wherein the mat comprises at least 85 percent by weight of the magnesium aluminum silicate glass fibers based on the total weight of the mat.

156. The non-woven mat according to any of embodiments 134 to 149, wherein the mat comprises at least 90 percent by weight of the magnesium aluminum silicate glass fibers based on the total weight of the mat.

157. The non-woven mat according to any of embodiments 134 to 149, wherein the mat comprises at least 15 percent by weight of the heat-treated silica fibers, based on the total weight of the mat.

158. The non-woven mat according to any of embodiments 134 to 149, wherein the mat comprises at least 20 percent by weight of the heat-treated silica fibers, based on the total weight of the mat.

159. The non-woven mat according to any of embodiments 134 to 149, wherein the mat comprises at least 25 percent by weight of the heat-treated silica fibers, based on the total weight of the mat.

160. The non-woven mat according to any of embodiments 134 to 149, wherein the mat comprises at least 30 percent by weight of the heat-treated silica fibers, based on the total weight of the mat.

161. The non-woven mat according to any of embodiments 134 to 149, wherein the mat comprises at least 35 percent by weight of the heat-treated silica fibers, based on the total weight of the mat.

162. The non-woven mat according to any of embodiments 134 to 149, wherein the mat comprises at least 40 percent by weight of the heat-treated silica fibers, based on the total weight of the mat.

163. The non-woven mat according to any of embodiments 134 to 160, wherein the non-woven mat is needled-punched.

164. The non-woven mat according to any of embodiments 134 to 162, wherein the non-woven mat is made via a wet-laid process.

165. The non-woven mat according to any of embodiments 134 to 162, wherein the non-woven mat is made via a dry-laid process.

166. The non-woven mat according to embodiment 163, wherein the non-woven mat as-made prior to heating above 500° C. contains not greater than 5 percent by weight organic material, based on the total weight of the mat.

167. The non-woven mat according to embodiment 163, wherein the non-woven mat as-made prior to heating above 500° C. contains not greater than 4 percent by weight organic material, based on the total weight of the mat.

168. The non-woven mat according to embodiment 163, wherein the non-woven mat as-made prior to heating above 500° C. contains not greater than 3 percent by weight organic material, based on the total weight of the mat.

169. The non-woven mat according to embodiment 163, wherein the non-woven mat as-made prior to heating above 500° C. contains not greater than 2 percent by weight organic material, based on the total weight of the mat.

170. The non-woven mat according to embodiment 163, wherein the non-woven mat as-made prior to heating above 500° C. contains not greater than 1 percent by weight organic material, based on the total weight of the mat.

171. The non-woven mat according to embodiment 163, wherein the non-woven mat as-made prior to heating above 500° C. contains not greater than 0.75 percent by weight organic material, based on the total weight of the mat.

172. The non-woven mat according to embodiment 163, wherein the non-woven mat as-made prior to heating above 500° C. contains not greater than 0.5 percent by weight organic material, based on the total weight of the mat.

173. The non-woven mat according to embodiment 163, wherein the non-woven mat as-made prior to heating above 500° C. contains not greater than 0.25 percent by weight organic material, based on the total weight of the mat.

174. The non-woven mat according to embodiment 163, wherein the non-woven mat as-made prior to heating above 500° C. contains not greater than 0.1 percent by weight organic material, based on the total weight of the mat.

175. The non-woven mat according to embodiment 163, wherein the non-woven mat as-made prior to heating above 500° C. contains zero percent by weight organic material, based on the total weight of the mat.

176. The non-woven mat according to any of embodiments 134 to 173, wherein the non-woven mat has an as-made bulk density in a range from 0.05 g/cm$^3$ to 0.3 g/cm$^3$.

177. The non-woven mat according to any of embodiments 134 to 174, wherein the magnesium aluminum silicate glass fibers are selected from the group consisting of E-glass fibers, S-glass fibers, S-2 glass fibers, R-glass fibers, and mixture thereof.

178. The non-woven mat according to any of embodiments 134 to 175, wherein the non-woven mat has a thickness in the range from 3 mm to 50 mm.

179. The non-woven mat according to any of embodiments 134 to 176, wherein the non-woven mat has a tensile strength of at least 10 kPa.

180. The non-woven mat according to any of embodiments 134 to 177, wherein the magnesium aluminum silicate fibers have diameters of at least 5 micrometers.

181. The non-woven mat according to any of embodiments 134 to 178, wherein the magnesium aluminum silicate fibers are shot-free.

182. The non-woven mat according to any of embodiments 134 to 179, wherein the non-woven mat comprises not greater than 5 percent by weight organic material, based on the total weight of the mat.

183. The non-woven mat according to embodiment 180, further comprising binder.

184. The non-woven mat according to any of embodiments 134 to 181, wherein the non-woven mat is non-intumescent.

185. The non-woven mat according to any of embodiments 134 to 182, wherein the non-woven mat is free of vermiculite.

186. A pollution control device comprising a pollution control element mounted in a casing with the mat according to any of embodiments 134 to 183.

187. The pollution control device according to embodiment 184, wherein the pollution element is one of a catalytic converter, a diesel particulate filter or a selective catalytic reduction element.

188. An exhaust system comprising a double walled exhaust component and the mat according to any of embodiments any of embodiments 134 to 183, wherein the mat is positioned in a gap between the walls of the double wall exhaust component.

189. The exhaust system according to embodiment 186, wherein the double walled exhaust component is an exhaust pipe.

190. The exhaust system according to embodiment 186, wherein the double walled exhaust component is an end cone of a pollution control device.

191. The exhaust system according to embodiment 186, wherein the double walled exhaust component is an exhaust manifold.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Test Methods

Real Condition Fixture Test (RCFT)

This test was used to measure the pressure exerted by the sheet material under conditions representative of actual conditions found in a pollution control element such as a catalytic converter in actual use.

A sheet sample material having dimensions of 44.45 mm by 44.45 mm was placed between two 50.8 mm by 50.8 mm heated, metal platens having independent heating controls. Each platen was heated incrementally from room temperature (about 25° C.) to a different temperature profile to simulate the temperatures of the metal housing and the monolith in a pollution control device. During heating, the gap between the platens was increased by a value calculated from the temperatures and thermal expansion coefficients of a typical catalytic converter housing and monolith. After heating to the maximum temperature of 700° C. for the platen representing the monolith side and 400° C. for the platen representing the metal housing side (also referred to herein as 700° C./400° C.), the platens were cooled incrementally while the gap was decreased by a value calculated from the temperatures and thermal expansion coefficients. This thermal cycling was conducted three times.

The materials were initially compressed to a starting pressure of 200 kilopascals (kPa). The force exerted by the mounting material was measured using a Sintech ID computer controlled load frame with an Extensometer (obtained from MTS Systems Corp., Research Triangle Park, N.C.) The pressure exerted by the mat during the heating and cooling cycle is plotted against the temperature profile. The sample and platens were cooled to room temperature, and the cycle was usually repeated two more times to produce a graph having 3 plots of pressure vs. temperature. A minimum value of at least 50 kPa for each of the three cycles was typically considered desirable for a mounting mat. Lower values may still be suitable depending on the particular application.

Thermal Mechanical Analyzer (TMA)

For purposes of this disclosure, this test was used to evaluate the shrinkage of non-intumescent, non-woven mats described here at certain elevated temperatures. In this test, the thickness of the non-woven mat was continuously measured and recorded under a constant pressure, as it was isothermally heated to 700° C. or 750° C. and then cooled down to room temperature. This test, however, was not intended to simulate a real converter environment.

Each sample (11 mm diameter circle) was placed in a conventional furnace and heated uniformly at a rate of 15° C. per minute. A 7 mm quartz rod rested on top of the mat; the rod supported a 1350 gram weight, resulting in a constant pressure of 345 kPa (50 psi) on the mat. As the mat shrank, the quartz rod moved downward. This displacement was measured and recorded as a function of mat temperature. Since quartz has a very low coefficient of thermal expansion, it was presumed the rod did not affect the measured shrinkage.

Tensile Test

The tensile test was used to evaluate certain handability characteristics of the non-woven mats as they may relate to the process of making and using the mat. It is desirable that the non-woven mat not tear or break when handled, wrapped around the monolith, or canned. After the mat is mounted inside the converter assembly, tensile strength is no longer an issue.

Each sample was cut in a strip 1 inch (2.5 cm) wide and 7 inch (17.8 cm) long in the down-web direction. A conventional caliper was used to measure the thickness of the sample over a 2.5 inch (6.25 cm) diameter area under a pressure of 0.715 psi (4.9 kPa). Samples were tested on a tensile tester (obtained under the trade designation "QC 1000 MATERIALS TESTER" from Thwing & Albert, West Berlin, N.J.) with an initial gap of 5 inch (12.7 cm), and a crosshead speed of 1 inch/min. (2.5 cm/min.).

Comparative Example

R-glass (magnesium aluminum silicate) fibers (10 micrometer in diameter, 36 mm long; obtained from Saint Gobain Vetrotex, Chambery, France) were opened in a two-zone opener having a lickerin roll equipped with pins (obtained from Laroche, Cours la ville, France). The strands were fed directly into the second zone with a feed speed of 3 m/min and a lickerin roll speed of 2,000 rpm. The output speed was 6.0 m/min. The opened fibers were then fed into a web-forming machine (obtained under the trade designation "RANDO WEBBER"), wherein the fibers were blown onto a porous metal roll to form a continuous web.

The continuous web was then needle-bonded on a conventional needle tacker using needles type GB15×16× 3½R222G53047 (obtained from Groz-Beckert Group, Germany). The needle density was 1.2 needles per $cm^2$. The needle board worked from the top with a needle frequency of 100 cycles/min. Input speed was 1 m/min and the output speed was 1.05 m/min. The penetration of the needles was 10 mm. The non-woven mats had a density of 24 punches per cm². The basis weight of the non-woven mats off the web-forming machine was about 1000 g/m².

The Comparative Example non-woven mat was subjected to the Real Condition Fixture Test (RCFT) and the Thermal Mechanical Analyzer (TMA) tests. RCFT data for the Comparative Example is summarized in Table 1, below.

TABLE 1

| Example | Mount density, g/cm³ | Weight per unit area, g/m² | Starting pressure, kPa | Starting 3$^{rd}$ cycle pressure, kPa | Third cycle lowest pressure, kPa | Resiliency Value |
|---|---|---|---|---|---|---|
| Comparative | 0.34 | 1392 | 207 | 65 | 21.4 | 1.00 |
| 1 | 0.38 | 1417 | 206 | 100 | 39 | 1.82 |
| 2 | 0.38 | 1407 | 206 | 109 | 39 | 1.82 |

The lowest pressure retained for the Comparative Example mat during the third cycle was used as a reference to evaluate the other Examples. Resiliency Value is calculated as follow:

$$\text{Resiliency Value Example } N = \frac{\text{Third Cycle Lowest Pressure Example } N}{\text{Third Cycle Lowest Pressure Example 1}}$$

TMA data for the Comparative Example is also summarized in Table 2, below.

TABLE 2

| Example | Shrinkage at 700° C., % | Shrinkage Reduction Value at 700° C., % | Shrinkage at 750° C., % | Shrinkage Reduction Value at 750° C., % |
|---|---|---|---|---|
| Comparative | 24.20 | 0.00 | 20.100 | 0.00 |
| 1 | 16.70 | 30.99 | | |
| 2 | 16.00 | 33.88 | 14.100 | 29.85 |

Mat shrinkage at 700° C. and 750° C. was calculated with respect to the initial mat thickness at 25° C. Shrinkage Reduction Value was the percentage of shrinkage that was reduced between each Example and the Comparative Example.

Example 1

A mat comprising 75% by weight R-glass fibers (as described in the Comparative Example) and 25% by weight heat-treated silica fibers from (9 micrometers in diameter; obtained under the trade designation "REFRASIL" from HITCO, Gardena, Calif.) was prepared as described for the Comparative Example.

The Example 1 non-woven mat was subjected to the Real Condition Fixture Test (RCFT) and the Thermal Mechanical Analyzer (TMA). RCFT data for Example 1 is summarized in Table 1, above. The Resiliency Value of the Example 1 non-woven mat was greater than 1.1. TMA data for Example 1 is also summarized in Table 2, above. The mat shrinkage at 700° C. for Example 1 was reduced by 30% as compared to that for the Comparative Example.

Example 2

A mat comprising 75% by weight R-glass fibers (as described in the Comparative Example) and 25% by weight biosoluble ceramic fibers (unchopped; obtained under the trade designation "ISOFRAX" from Unifrax Corporation, Niagara Falls, N.Y.) was prepared as described for the Comparative Example.

The Example 2 non-woven mat was subjected to the Real Condition Fixture Test (RCFT) and the Thermal Mechanical Analyzer (TMA). RCFT data for Example 2 is summarized in Table 1, above. The Resiliency Value of the Example 2 non-woven mat was greater than 1.1. TMA data for Example 2 is summarized in Table 2, above.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A non-woven mat comprised of a blend comprised of at least 60 percent by weight magnesium aluminum silicate glass fibers and at least 10 percent by weight fibers selected from the group consisting of amorphous refractory ceramic fibers, bio-soluble ceramic fibers, heat-treated silica fibers, and mixtures thereof, based on the total weight of the mat, wherein the magnesium aluminum silicate glass fibers comprise $Al_2O_3$ in a range from 10 to 30 percent by weight, $SiO_2$ in a range from 52 to 70 percent by weight, and MgO in a range from 1 to 12 percent by weight, based on the total weight of the magnesium aluminum silicate glass fiber, and wherein the non-woven mat is collectively comprised of at least 80 percent by weight of said magnesium aluminum silicate glass fibers and said fibers selected from the group consisting of amorphous refractory ceramic fibers, bio-soluble ceramic fibers, heat-treated silica fibers, and mixtures thereof, based on the total weight of the mat, and wherein the magnesium aluminum silicate glass fibers and the fibers selected from the group consisting of amorphous refractory ceramic fibers, bio-soluble ceramic fibers, heat-treated silica fibers, and mixtures thereof present in the blend collectively provide the non-woven mat with a Resiliency Value after three thermal cycles from 25° C. to 700° C./400° C. of the Real Condition Fixture Test at least 1.1 times greater than the Resiliency Value of a comparable non-woven mat consisting of any individual magnesium aluminum silicate glass fibers, amorphous refractory ceramic fibers, bio-soluble ceramic fibers, heat-treated silica fibers, present in the blend of fibers.

2. A non-woven mat according to claim 1, wherein the non-woven mat comprises a blend comprised of at least 60 percent by weight magnesium aluminum silicate glass fibers and at least 10 percent by weight bio-soluble ceramic fibers, and wherein the non-woven mat is collectively comprised of at least 80 percent by weight of said magnesium aluminum silicate glass fibers and said bio-soluble ceramic fibers, based on the total weight of the mat.

3. The non-woven mat according to claim 1, wherein the non-woven mat comprises a blend comprised of at least 60 percent by weight magnesium aluminum silicate glass fibers and at least 10 percent by weight heat-treated silica fibers, and wherein the non-woven mat is collectively comprised of at least 80 percent by weight of said magnesium aluminum silicate glass fibers and said heat-treated silica fibers, based on the total weight of the mat.

4. The non-woven mat according to claim 1, wherein the non-woven mat as-made prior to heating above 500° C. contains not greater than 5 percent by weight organic material, based on the total weight of the mat.

5. The non-woven mat according to claim 1, wherein the non-woven mat is non-intumescent.

6. The non-woven mat according to claim 1, wherein the mat comprises at least 70 percent by weight of the magnesium aluminum silicate glass fibers based on the total weight of the mat.

7. The non-woven mat according to claim 1, wherein the mat comprises at least 80 percent by weight of the magnesium aluminum silicate glass fibers based on the total weight of the mat.

8. The non-woven mat according to claim 1, wherein the mat comprises at least 15 percent by weight of the fibers selected from the group consisting of amorphous refractory ceramic fibers, bio-soluble ceramic fibers, heat-treated silica fibers, and mixtures thereof based on the total weight of the mat.

9. The non-woven mat according to claim 1, wherein the mat comprises at least 20 percent by weight of the fibers selected from the group consisting of amorphous refractory ceramic fibers, bio-soluble ceramic fibers, heat-treated silica fibers, and mixtures thereof based on the total weight of the mat.

10. The non-woven mat according to claim 1, wherein the non-woven mat has an as-made bulk density in a range from 0.05 g/cm$^3$ to 0.3 g/cm$^3$.

11. The non-woven mat according to claim 1, wherein the non-woven mat has a thickness in the range from 3 mm to 50 mm.

12. The non-woven mat according to claim 1, wherein the magnesium aluminum silicate fibers have diameters of at least 5 micrometers.

13. The non-woven mat according to claim 1, wherein the magnesium aluminum silicate fibers are shot-free.

14. A pollution control device comprising a pollution control element mounted in a casing with the mat according to claim 1.

15. An exhaust system comprising a double walled exhaust component and the mat according to claim 1, wherein the mat is positioned in a gap between the walls of the double wall exhaust component.

16. The non-woven mat according to claim 6, wherein the mat comprises at least 20 percent by weight of the fibers selected from the group consisting of amorphous refractory ceramic fibers, bio-soluble ceramic fibers, heat-treated silica fibers, and mixtures thereof based on the total weight of the mat.

17. The non-woven mat according to claim 7, wherein the mat comprises at least 15 percent by weight of the fibers selected from the group consisting of amorphous refractory ceramic fibers, bio-soluble ceramic fibers, heat-treated silica fibers, and mixtures thereof based on the total weight of the mat.

18. The non-woven mat according to claim 6, wherein the non-woven mat is non-intumescent.

19. The non-woven mat according to claim 7, wherein the non-woven mat is non-intumescent.

20. The non-woven mat according to claim 1, wherein the non-woven mat has an as-made bulk density in a range from 0.05 g/cm$^3$ to 0.3 g/cm$^3$, a thickness in the range from 3 mm to 50 mm, and the magnesium aluminum silicate fibers are shot free with diameters of at least 5 micrometers.

* * * * *